United States Patent [19]
Parekh

[11] Patent Number: 5,149,453
[45] Date of Patent: Sep. 22, 1992

[54] METHOD FOR DETECTING LEAKAGE IN A REFRIGERATION SYSTEM

[75] Inventor: Manher Parekh, Warren, Mich.

[73] Assignee: H. B. Fuller Automotive Products, Inc., Shoreview, Minn.

[21] Appl. No.: 668,716

[22] Filed: Mar. 12, 1991

Related U.S. Application Data

[60] Continuation of Ser. No. 430,958, Nov. 1, 1989, abandoned, which is a continuation of Ser. No. 181,188, Apr. 11, 1988, abandoned, which is a division of Ser. No. 704,666, Feb. 25, 1985, Pat. No. 4,758,366.

[51] Int. Cl.$^5$ .................. G01N 21/64; G01M 3/04; C09K 5/04
[52] U.S. Cl. .................. 252/68; 252/301.19; 252/964; 73/40; 73/40.7; 374/4
[58] Field of Search .................. 252/68, 964, 301.19; 73/40, 40.7; 374/4

[56] References Cited

U.S. PATENT DOCUMENTS

| | | | |
|---|---|---|---|
| 1,915,965 | 6/1933 | Williams | 252/68 |
| 1,967,871 | 7/1934 | Dantsizen | 252/68 |
| 3,386,920 | 6/1968 | Alburger | 252/301.19 |
| 3,489,898 | 1/1970 | Alburger . | |
| 3,770,640 | 11/1973 | Bartlett | 252/68 |
| 4,170,564 | 10/1979 | Brendle | 252/68 |
| 4,249,412 | 2/1981 | Townsend, III | 73/40.7 |
| 4,369,120 | 1/1983 | Stelz et al. | 252/68 |

FOREIGN PATENT DOCUMENTS 359449 3/1990 European Pat. Off. .
57-120834 7/1982 Japan .

Primary Examiner—Paul Lieberman
Assistant Examiner—Christine A. Skane
Attorney, Agent, or Firm—Merchant, Gould, Smith, Edell, Welter & Schmidt

[57] ABSTRACT

A leak detectable refrigeration composition comprising an effective amount of a fluorescent, alkyl substituted perylene dye dissolved in a refrigeration oil and a polyhalogenated hydrocarbon refrigerant, is prepared for use in refrigeration systems in automobile air conditioning systems, commercial refrigeration systems, and the like. Upon exposure to ultraviolet light, there is sufficient fluorescence by the refrigeration liquid to allow one to visually detect a leak in the system due to the presence of the dye at the source of the leak. Small leaks which were previously nondetectable with dye coloring systems detectable in normal light may now be detected due to the greater visibility of the fluorescent dye under an ultraviolet light.

11 Claims, No Drawings

METHOD FOR DETECTING LEAKAGE IN A REFRIGERATION SYSTEM

This is a continuation, of application Ser. No. 07/430,958, filed Nov. 1, 1989, now abandoned; which is a continuation of application Ser. No. 07/181,188 filed Apr. 11, 1988, now abandoned; which is a divisional of application Ser. No. 06/704,666 filed Feb. 25, 1985, now U.S. Pat. No. 14,758,366.

TECHNICAL FIELD

This invention relates to a leak detection composition and method for use with air conditioning and other refrigeration systems.

BACKGROUND ART

Daylight visible dyes have been employed to detect leaks in refrigeration systems utilizing fluorocarbon refrigerants and refrigeration oils. At the site of the leak, the escaping refrigerants and refrigeration oils containing visible dyes are detectable in normal light to a slight extent depending on the size of the leak.

Traditionally, oil soluble azo and anthraquinone dyes have been used as leak detectors in fluorocarbon refrigerants. These dyes are insufficiently stable at high temperatures such as those produced in automotive and commercial refrigeration systems. Low solubility of these dyes in the refrigerants and refrigeration oils results in clumps of dye powders being circulated through the system. Such clumps may clog the refrigeration system.

U.S. Pat. No. 1,915,965 discloses a method of testing for leaks in a refrigeration system of the compression type. Basic daylight visible dyes, such as methyl violet base, crystal violet, auramine B, rhodamine B, etc., are disclosed for use as leak detectors in refrigeration systems. These basic dyes are unstable at high temperatures and may be converted to tars which plug the system. Such basic dyes also have a low solubility in widely used refrigeration oils.

U.S. Pat. No. 4,369,120 discloses anthraquinone blue dyes for use as visual leak detectors in refrigerants, refrigeration oils, and admixtures of both. These blue dyes are visual leak indicators which readily stain surrounding areas of a leak in a refrigeration system due to their intense blue color which is differentiable from leaks of other fluid systems; e.g., red fuel oil or other colored fluids in automotive systems. The problems with these blue dyes are inherent to all visible dyes as described above.

SUMMARY OF THE INVENTION

An object of the present invention is to provide an improved leak detectable refrigeration composition comprising an effective amount of a fluorescent, alkyl substituted perylene dye combined with a refrigeration oil and a polyhalogenated hydrocarbon refrigerant. The refrigeration oil may be selected from the group consisting of paraffinic oils and alkylated benzenes. The fluorescent dye is a fluorescent, refrigeration liquid soluble, alkyl substituted perylene dye.

Fluorescent dyes are preferable to conventional visible dyes because exposure thereof to ultraviolet light provides fluorescence that is more readily apparent. It is also easier to differentiate fluorescent dyes from other standard daylight visible dyes used in automotive fluid systems such as engine oil fluid, transmission fluid, and coolant fluid. Fluorescent dyes are also advantageous as they are barely visible in daylight, even though readily visible under ultraviolet light. Furthermore, fluorescent dyes are non-staining because they are easily washable with aliphatic non-toxic solvents, as opposed to the toxic aromatic or chlorinated solvents required to clean visible dyes.

In accordance with the preferred composition, this invention utilizes a fluorescent dye which is stable at high temperatures up to 400° Fahrenheit, possesses sufficiently high solubility in a number of currently used refrigeration liquids, does not change the properties of oils into which it is dissolved, does not produce adverse effects on refrigeration system parts such as gaskets, compressors and the like, and may be easily differentiated from other fluid systems leak indicators. The composition of the present invention will not stain acrylic finishes, such as automotive paint, or refrigerator cabinets, as well as the skin and clothing of system operators.

There is no need to change fluids after the leak has been repaired, because the dye can coexist with system fluids without adversely affecting the refrigeration system parts. As the dye is not removed from the system, the test may be repeated to insure that the leak has been successfully repaired and that no additional leaks exist. After the leak is repaired, excess oil and dye may be removed from surface areas with any aliphatic non-toxic solvent, not requiring toxic, aromatic or chlorinated solvents.

Further, according to the invention, a method for detecting leakage in a refrigeration system comprises circulating a composition as described above through the refrigeration system and thereafter subjecting the refrigeration system to an ultraviolet light to fluoresce any dye which escapes therefrom through a leak to thereby locate the leak such that the leak can be repaired. If the leak is sufficiently large, streams of fluorescently dyed refrigerant may be seen emanating from the leak source. Traditional daylight visible dyes are not sufficiently soluble in the refrigerant to act likewise.

DESCRIPTION OF THE INVENTION

The present invention is directed to a composition useful in the detection of leaks in refrigeration systems. The composition includes a refrigeration liquid, comprising a polyhalogenated hydrocarbon refrigerant and refrigeration oil, and an effective amount of an alkyl substituted fluorescent dye. The fluorescent dye is a fluorescent, refrigeration liquid soluble, alkyl substituted perylene dye. Preferably, the fluorescent dye is dinaptho[1,2,3-cd: 1',2',3'lm]perylene-9,18-dione, dodecyl derivative commercially available as Fluorescent Yellow 133SC from Morton Chemical Company.

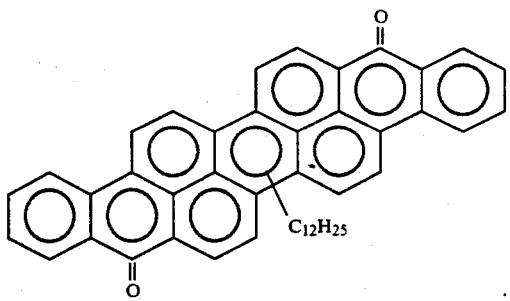

Polyhalogenated hydrocarbon refrigerants which may be used include
trichloromonofluoromethane,
dichlorodifluoromethane,
monochlorotrifluoromethane,
dichloromonofluoroethane,
monochlorodifluoromethane,
trichlorotrifluoroethane,
dichlorotetrafluoroethane,
1,1,2-trichloro-1,2,2,-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope,
chlorotrifluoromethane/trifluoromethane azeotrope,
bromotrifluoromethane,
trifluoromethane,
chloropentafluoroethane,
difluoromethane/chloropentafluoroethane azeotrope,
chloropentafluoroethane/1,1-difluoroethane azeotrope,
dichlorodifluoromethane/chlorofluoromethane azeotrope,
chlorofluoromethane/1,2-dichlorotetrafluoroethane azeotrope,
difluoromethane,
1,2-dibromotetrafluoroethane,
1,1,1-trifluoroethane,
1,1-difluoro-1-chloroethane,
1,1-difluoroethane,
bromotrifluoromethane/difluoromethane azeotrope,
1,2-dichlorotetrafluoroethane/dichlorofluoromethane azeotrope, and
hexafluoroethane/trifluoromethane azeotrope.

The refrigeration oils which may be used include paraffinic oils and alkylated benzenes. In the refrigeration liquid, the ratio of refrigeration oil to refrigerant may be in the range of from about 1:3 to about 1:100.

A method according to this invention for detecting leakage in a refrigeration system is performed by adding a fluorescent dye solution or fluorescent dye to refrigeration oil and thereafter introducing the oil with the dye therein into a polyhalogenated hydrocarbon refrigerant of a refrigeration system.

Another method according to this invention is performed by adding a fluorescent dye solution into a polyhalogenated hydrocarbon refrigerant and thereafter introducing the refrigerant into the refrigeration system.

In performing both methods, the refrigeration system is operated for a period of time to thoroughly mix the fluorescent dye within the refrigeration system fluid. The system is then subjected to an ultraviolet light to fluoresce any dye which escapes therefrom through a leak. Visual inspection under the ultraviolet light will locate the leak. After the leak is repaired, excess fluid and dye may be removed from the surface area with a solvent. The refrigeration system is then operated again to insure that the leak has been successfully repaired, and that no additional leaks exist.

A further method for detecting the leakage in a refrigeration system includes circulating through the refrigeration system a composition as described above including a refrigerant, a refrigeration oil or a mixture of both having a fluorescent dye dissolved therein in the concentration of at least 0.001 grams per 100 grams of the refrigeration liquid.

Another method according to the invention is performed by dissolving a fluorescent dye in a refrigeration oil, then introducing the dye and oil into a polyhalogenated hydrocarbon refrigerant, and then introducing the refrigerant with dye and oil therein into a refrigeration system. After a certain period of operation, various portions of the refrigeration system are subjected to an ultraviolet light source to fluoresce any dye which escapes therefrom through a leak to thereby locate the leak such that the leak can be repaired.

While the best mode has been described in detail, those familiar with the art to which this invention relates will recognize various alternative compositions and methods for practicing the invention as defined by the following claims.

What is claimed is:

1. A method of detecting a leak in a refrigeration system, the method comprising:
   (a) circulating in a refrigeration system a composition that fluoresces under ultraviolet light comprising:
      (i) a refrigeration liquid comprising a polyhalogenated hydrocarbon refrigerant and a refrigeration oil; and
      (ii) an effective amount of a fluorescent, alkyl substituted perylene dye compound; wherein the fluorescent dye is soluble in the refrigeration liquid and does not adversely affect the operation of a refrigeration system; and
   (b) exposing the refrigeration system to ultraviolet light to fluoresce any of the fluorescent composition on the exterior of the refrigeration system;
wherein a leak in the refrigeration system may be detected.

2. The method of claim 1 wherein the refrigeration oil comprises a paraffinic oil.

3. The method of claim 1 wherein the perylene compound comprises dinaphthoperylene-9,18-dione, dodecyl derivative, having the structure:

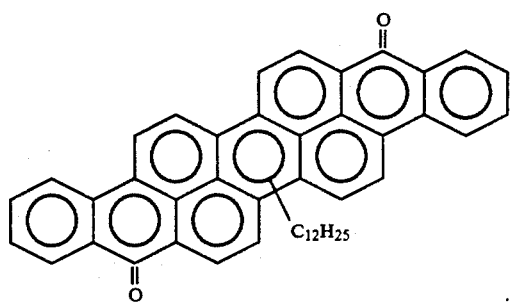

4. The method of claim 1 wherein the refrigeration liquid comprises about 3 to 100 grams of refrigerant per gram of refrigeration oil.

5. The method of claim 1 further comprising introducing into the refrigerant of a refrigeration system a solution of the fluorescent dye compound in the refrigeration oil.

6. A method of detecting a leak in a refrigeration system, the method comprising:

(a) introducing into a refrigeration system a composition that fluoresces under ultraviolet light comprising:

(i) a refrigeration liquid comprising a polyhalogenated hydrocarbon refrigerant and a refrigeration oil; and (ii) an effective amount of a fluorescent, alkyl substituted perylene dye compound; wherein the fluorescent dye is soluble in the refrigeration liquid and does not adversely affect the operation of a refrigeration system;

(b) circulating the composition through the refrigeration system; and (c) exposing the refrigeration system to ultraviolet light to fluoresce any of the fluorescent composition on the exterior of the refrigeration system;

wherein a leak in the refrigeration system may be detected.

7. The method of claim 6 wherein the refrigeration oil comprises a paraffinic oil.

8. The method of claim 6 wherein the perylene compound comprises dinaphthoperylene-9,18-dione, dodecyl derivative, having the structure:

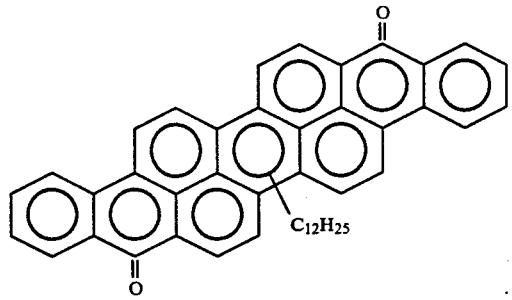

9. A method of detecting a leak in a refrigeration system, the method comprising:

(a) introducing into a refrigeration liquid of a refrigeration system, which liquid comprises a polyhalogenated hydrocarbon refrigerant and a refrigeration oil, a composition that fluoresces under ultraviolet light comprising:

(i) a refrigeration oil; and (ii) an effective amount of a fluorescent, alkyl substituted perylene dye compound; wherein the fluorescent dye is soluble in the oil and the refrigeration liquid and does not adversely affect the operation of a refrigeration system;

(b) circulating the refrigeration liquid and fluorescent composition through the refrigeration system; and (c) exposing the refrigeration system to ultraviolet light to fluoresce any of the fluorescent composition on the exterior of the refrigeration system;

wherein a leak in the refrigeration system may be detected.

10. The method of claim 9 wherein the refrigeration oil comprises a paraffinic oil.

11. The method of claim 9 wherein the perylene compound comprises dinaphthoperylene-9,18-dione, dodecyl derivative, having the structure:

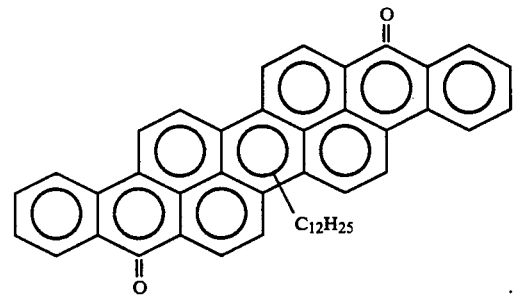

* * * * *